United States Patent

Nagasawa et al.

[19]

[11] Patent Number: 5,850,226

[45] Date of Patent: *Dec. 15, 1998

[54] METHOD OF TRANSFERRING AND DISPLAYING 3-D SHAPE DATA

[75] Inventors: Mikio Nagasawa; Daisuke Nishioka, both of Tokyo, Japan

[73] Assignee: Ultra-High Speed Network and Computer Technology Laboratories, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 708,800

[22] Filed: Sep. 9, 1996

[30] Foreign Application Priority Data

Feb. 29, 1996 [JP] Japan ................................. 8-042545

[51] Int. Cl.⁶ ............................................. G06F 12/00
[52] U.S. Cl. ............................................. 345/428; 345/419
[58] Field of Search ................................ 345/139, 2, 428, 345/419

[56] References Cited

U.S. PATENT DOCUMENTS

| | | | |
|---|---|---|---|
| 5,239,625 | 8/1993 | Bogart et al. | 395/128 |
| 5,301,264 | 4/1994 | Hori et al. | 395/128 |
| 5,333,244 | 7/1994 | Harashima | 395/119 |
| 5,469,183 | 11/1995 | Takatsuji et al. | 345/2 |
| 5,471,566 | 11/1995 | Kirk | 395/119 |
| 5,471,569 | 11/1995 | Katoh | 395/119 |
| 5,508,713 | 4/1996 | Okouchi | 345/2 |
| 5,604,509 | 2/1997 | Moore et al. | 345/2 |
| 5,613,051 | 3/1997 | Iodice et al. | 395/128 |

FOREIGN PATENT DOCUMENTS

| | | | |
|---|---|---|---|
| 0 152 355 | 2/1985 | European Pat. Off. | G06F 15/40 |
| 0 581 256 | 7/1993 | European Pat. Off. | H04N 1/41 |

OTHER PUBLICATIONS

Image Coding–From Waveforms to Animation, IEEE Transactions on Acoustics, Speech and Signal Processing, vol. 37, No. 12, Dec. 1, 1989, pp. 2008–2023.

Multiresolution Analysis of Arbitrary Meshes, Computer Graphics Proceedings, Aug. 6–11, 1995, pp. 173–182.

Three–Dimensional Motion Estamation of Head in Model–Based Coding of Moving Facial Images, Electronics & Communications in Japan part I–Communications, vol. 75, part 1, No. 8, Aug. 1, 1992.

*Primary Examiner*—Amare Mengistu
*Assistant Examiner*—Ricardo Osorio
*Attorney, Agent, or Firm*—Blakely Sokoloff Taylor & Zafman

[57] ABSTRACT

In a method of transferring and displaying 3-D shape data in a system including a transmission unit for transmitting 3-D shape data constituted by a plurality of elements representing shapes, and a reception display unit for receiving the 3-D shape data and displaying the 3-D shape data as an image, the transmission unit is caused to progressively transmit the 3-D data in units of elements. The reception display unit is caused to receive elements transmitted from the transmission unit and to progressively display the elements in an reception order.

6 Claims, 5 Drawing Sheets

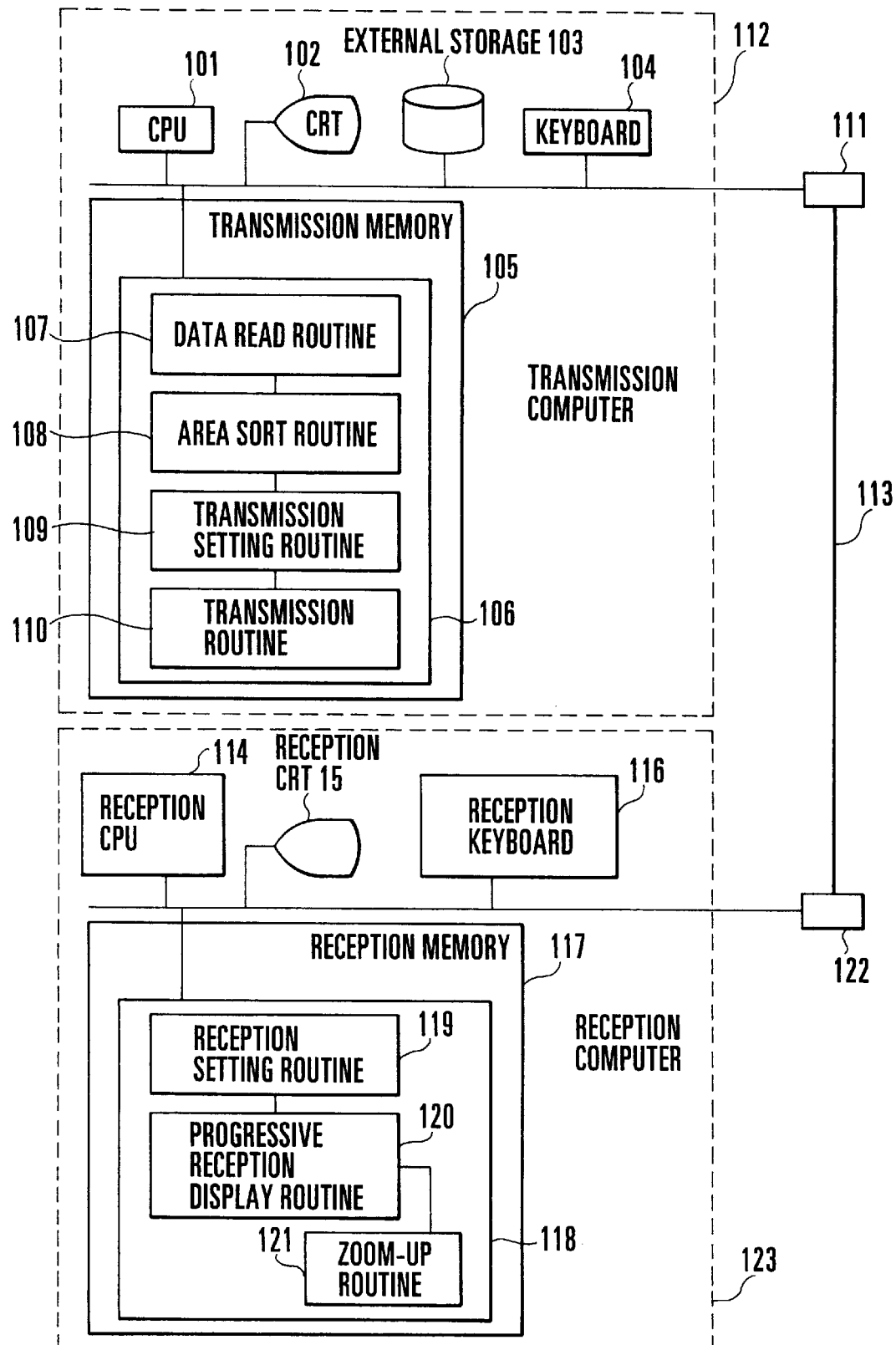
F I G. 1

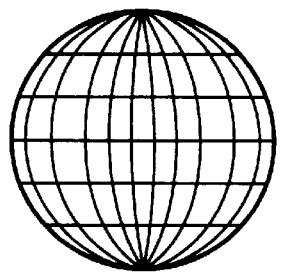
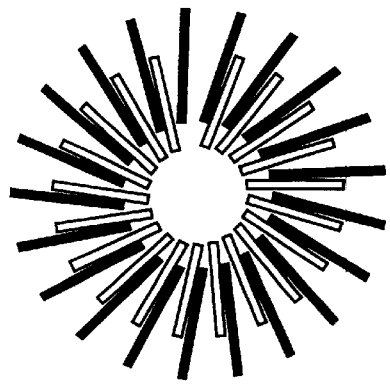
FIG. 6A        FIG. 6B
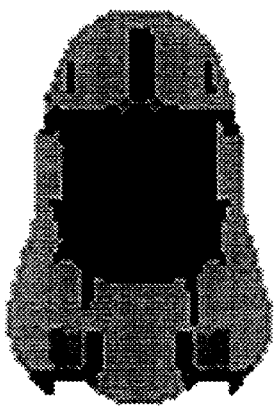
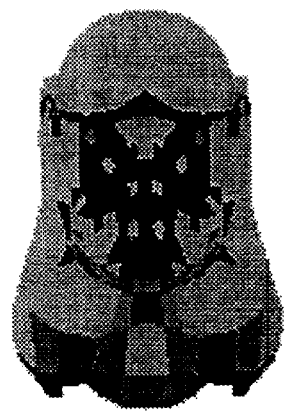
FIG. 7A        FIG. 7B
FIG. 7C        FIG. 7D

METHOD OF TRANSFERRING AND DISPLAYING 3-D SHAPE DATA

BACKGROUND OF THE INVENTION

The present invention relates to a method of transferring and displaying 3-D shape data in computer graphics for outputting 3-D shape data to a raster display device, interactive 3-D data communications, or 3-D shape data transfer in a communication network with data packet/cell losses.

In transfer and display of a 3-D image constituted by polygons and voxels, or area normal vectors, a transmitting side transfers a data file constituting the 3-D image.

A receiving side receives all the transmitted data, develops the received image, and then displays the developed data on a monitor such as a CRT for performing, e.g., a raster display.

Since the conventional method has the above procedures, 3-D image transfer particularly poses the following problems.

First, in conventional 3-D image transfer, data contents cannot be displayed until the receiving side completely receives all the data.

Since the data contents are unknown until the end of data reception, the data reception cannot be interrupted. Reception of wrong data results in the waste of time and network resources.

In the conventional method, as the transmitting side simply transmits 3-D image data, the 3-D image data may not be compatible with the display capacity of the receiving side.

For example, assume that the transmitted 3-D image data has a resolution higher than the displayable resolution of the receiving end, and that a display object in the transmitted image data has a size smaller than one pixel of the resolution at the receiving side.

In this case, the receiving side cannot display the image at all. Even if something is displayed on the monitor, it is only the one-pixel dot.

Under these circumstances, the receiving side tries to develop the image so as to display the received data, similarly resulting in the waste of time and graphics resources.

SUMMARY OF THE INVENTION

The present invention has been made to solve the conventional problems described above, and has as its object to allow the transfer and display of 3-D shape data at a higher speed without any waste.

In order to achieve the above object of the present invention, there is provided a method of transferring and displaying 3-D shape data in a system including a transmission unit for transmitting 3-D shape data constituted by a plurality of elements representing shapes, and a reception display unit for receiving the 3-D shape data and displaying the 3-D shape data as an image, comprising the steps of causing the transmission unit to progressively transmit the 3-D data in units of elements, and causing the reception display unit to receive elements transmitted from the transmission unit and progressively displaying the elements in an reception order.

BRIEF DESCRIPTION OF THE DRAWINGS

FIG. 1 is a block diagram showing the arrangement of a progressive data transfer/display system according to an embodiment of the present invention;

FIGS. 6A and 6B are views showing the 3-D shape data constituted by polygon data and area normal vectors, respectively; and FIGS. 7A to 7D are views for explaining states of data transfer/display according to this embodiment.

DESCRIPTION OF THE PREFERRED EMBODIMENT

Figure 2:
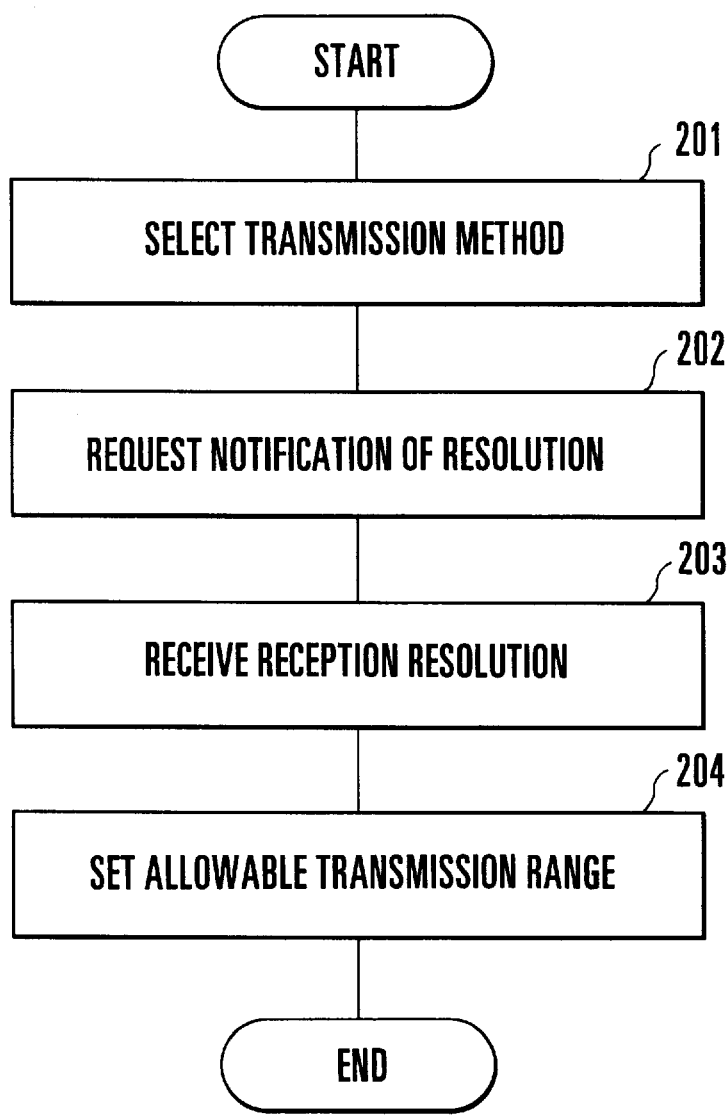
FIG. 2 is a flow chart showing the operations of a transmission setting routine 109.

The preferred embodiment of the present invention will be described below with reference to the accompanying drawings.

According to a method of progressively transferring and displaying 3-D shape data of the present invention, 3-D shape data are transferred in units of elements such as polygons and voxels, and the transmitted image is developed in units of received elements at a receiving side, thereby displaying the developed image.

The 3-D shape elements are progressively transmitted and displayed in an order from an element having an area attribute representing a larger area. At the receiving side, the received element is enlarged at an enlargement factor which causes the minimum unit of a display pixel to correspond to the transmitted minimum shape element, thereby displaying a figure.

Transmission of elements having resolutions higher than the display resolution limit can be interrupted, or these elements can be transferred at a high loss rate.

FIG. 1 shows the arrangement of a progressive data transfer/display system according to an embodiment of the present invention.

Referring to FIG. 1, reference numeral 101 denotes a CPU; 102, a CRT; and 103, an external storage for storing, as files, a large number of 3-D shape data constituting 3-D figure data.

Reference numeral 104 denotes a keyboard for allowing a user to input processing instructions; and 105, a transmission memory which stores a transmission processing program 106.

In response to an instruction input from the keyboard 104, the CPU 101 executes the transmission processing program 106 stored in the memory 105 to transmit 3-D figure data.

The transmission processing program 106 is constituted by a data read routine 107 for reading 3-D figure data from the external storage 103, an area sort routine 108 for sorting 3-D shape elements of the read data in accordance with area attributes, a transmission setting routine 109 for selecting a transmission method in accordance with the resolution of a receiving side, and a transmission routine 110 for transmitting the 3-D shape data.

All the components described above constitute a transmission computer 112 (transmission unit).

Reference numeral 114 denotes a reception CPU; 115, a reception CRT for displaying various kinds of information; 116, a reception keyboard for allowing the user to input processing instructions; and 117, a reception memory which stores a reception processing program 118.

In response to an instruction input from the reception keyboard 116, the reception CPU 114 executes the reception processing program 118 stored in the reception memory 117 to receive 3-D shape data.

The reception processing program 118 is constituted by a reception setting routine 119 for performing progressive transfer and display operations, a progressive reception display routine 120 for receiving 3-D shape data, and a zoom-up routine 121 for changing a display magnification for the 3-D shape data received in the progressive reception display routine 120.

The above components constitute a reception computer 123 (reception unit).

The transmission computer 112 for transferring data is connected to a network 113 through a connection terminal 111, and the reception computer 123 is connected to the network 113 through a connection terminal 122.

The progressive data transfer and display operations will be described below.

A predetermined 3-D figure data file is opened in a data accessible state. This file is stored in the external storage 103. The 3-D figure data stored in this file is loaded (data read routine 107).

The 3-D shape elements of the loaded 3-D figure data are sorted in accordance with their area attributes (area sort routine 108). These 3-D shape elements include, e.g., polygons and voxels, or area normal vectors.

A transfer method and conditions are set (transmission setting routine 109). 3-D shape data is transmitted in accordance with these settings (transmission routine 110). The transmission setting routine 109 and the transmission routine 110 will be described in detail later.

At the end of transfer settings, 3-D figure data is transmitted from the transmission computer 112 to the reception computer 123 through the network 113.

In response to the above operations, the reception computer 123 checks the reception resolution and performs reception settings, e.g., the reception computer 123 notifies the transmission computer 112 of the checked reception resolution (reception setting routine 119). The 3-D shape data transmitted from the transmission computer 112 through the network 113 is progressively received and displayed until no data is present (progressive reception display routine 120).

As described above, according to this embodiment, the transmission computer 112 progressively transmits 3-D shape data, and the reception computer 123 progressively receives and displays the transmitted 3-D shape data. For this reason, the state of the received data can be checked without receiving all the data.

The transmission setting routine 109 will be described in detail with reference to FIG. 2.

The transmission setting routine 109 allows the user to select at the time of transmission whether transmission of elements having resolutions higher than the display resolution limit is interrupted or whether a higher loss rate is set to transmit these elements (step 201). This selection may be automatically performed.

The transmission setting routine 109 requests the reception computer 123 to notify the display resolution (display capacity) at the reception side (step 202). The routine 109 receives the notified reception resolution from the reception computer 123 (step 203).

An allowable transmission range for interrupting transmission of elements having resolutions higher than the resolution limit is set for the element array sorted in an order of area attributes in the area sort routine 108 (step 204). When a higher loss rate is set in step 201, an allowable transmission bandwidth for setting this high loss rate is set.

Figure 3:
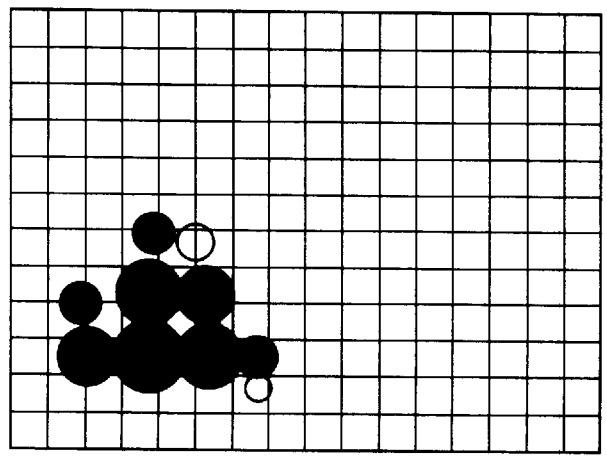
FIGS. 3A to 3C are views for explaining the relationship between the image resolutions at the receiving side and the sizes of elements to be displayed in this embodiment.
Figure 3:
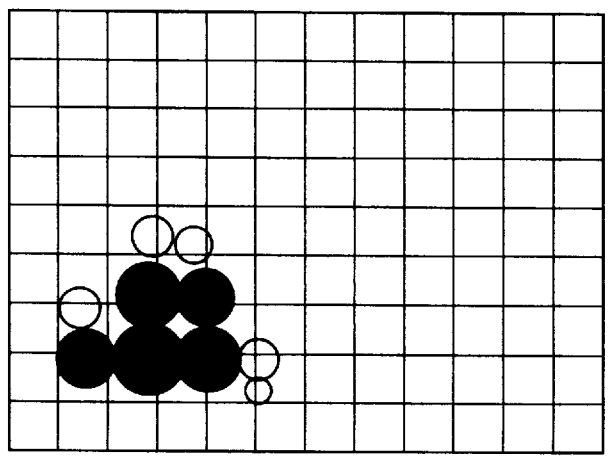
Figure 3:
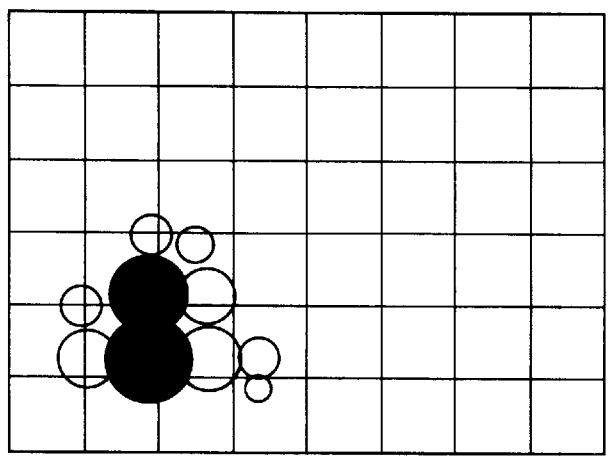

FIGS. 3A to 3C show the relationship between screen resolutions at the receiving side and the sizes of elements to be displayed.

The sizes of squares in FIGS. 3A to 3C represent the pixel resolutions. More specifically, FIG. 3A shows a high resolution at the receiving side, FIG. 3B shows an intermediate resolution at the receiving side and FIG. 3C shows a low resolution at the receiving side.

When the resolution is high at the receiving side, as shown in FIG. 3A, two elements indicated by white dots each having a size smaller than that of each square in FIG. 3A cannot be transmitted. Therefore, these two elements do not contribute to the display operation at the receiving side.

When the resolution is intermediate at the receiving side, as shown in FIG. 3B, five elements indicated by white dots each having a size smaller than that of each square in FIG. 3B cannot be transmitted. Therefore, the remaining five elements represented by black dots are transmitted and displayed.

When the resolution is low at the receiving side, as shown in FIG. 3C, eight elements indicated by white dots each having a size smaller than that of each square in FIG. 3C cannot be transmitted. Therefore, the remaining two elements represented by black dots are transmitted and displayed.

When data of elements such as polygons are transmitted in accordance with the reception resolution in the transmission setting routine 109, the following wasteful display operations can be omitted.

For example, when all the ten elements are transmitted regardless of the low reception resolution, the elements represented by the white dots in FIG. 3C are also transmitted. Although the elements having resolutions lower than that of the square do not contribute to the display operation effectively, the receiving side performs wasteful processing for forcibly displaying these elements.

The above operation can be prevented according to this embodiment.

Figure 4:
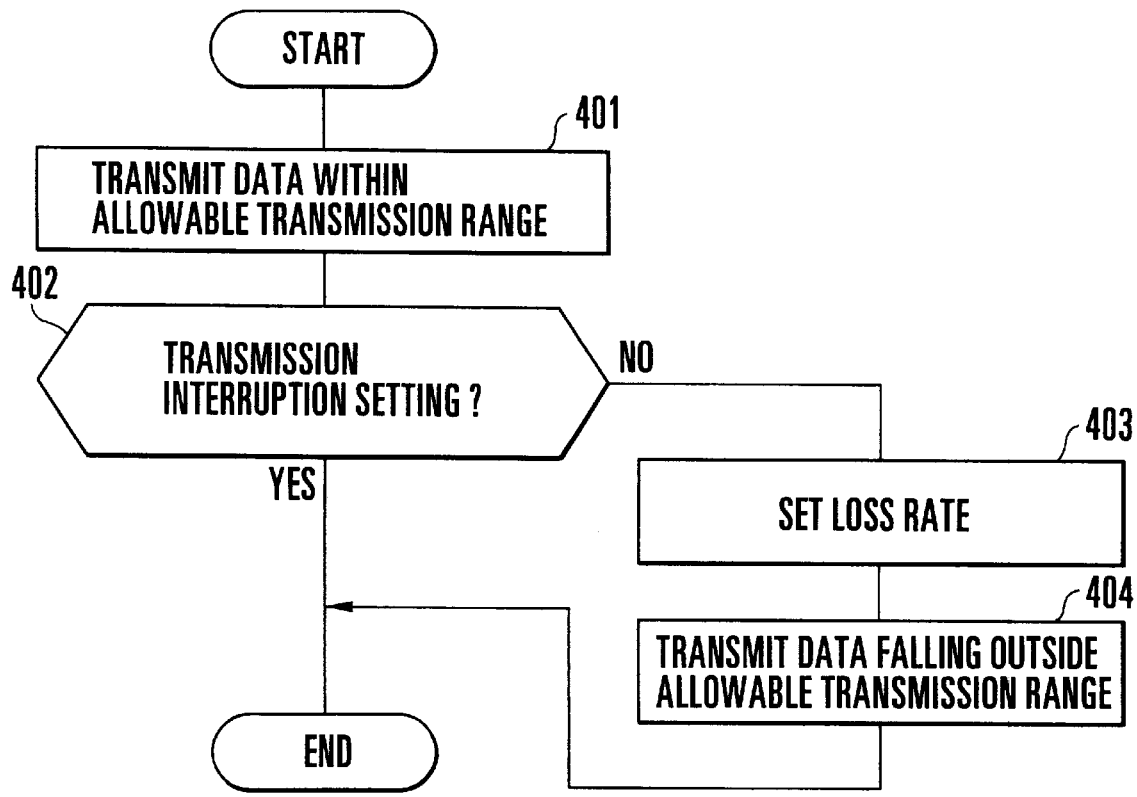
FIG. 4 is a flow chart showing the operations of a transmission routine 110 in FIG. 1.

The transmission routine 110 will be described in detail with reference to FIG. 4.

In the transmission routine 110, 3-D shape element data within the allowable transmission range set in the transmission setting routine 109 are transmitted (step 401).

Upon transmission, if the settings are made not to transmit elements falling outside the allowable transmission range (step 402), transmission is ended in accordance with the settings set in the transmission setting routine 109.

To the contrary, an element packet/cell loss rate is set high on the network in transfer of elements falling outside the allowable transmission range (step 402), the loss rate is set high (step 403), and data falling outside the allowable transmission range are transmitted (step 404).

Data transmission in step 404 is made without causing the receiving side to check data reception, e.g., without retransmission.

When the receiving side confirms that data is not received due to a communication congestion or error, data is normally retransmitted. That is, transmitted data is not displayed until its reception is confirmed.

To the contrary, upon transmitting data, e.g., once, data is displayed even if it is not received at the receiving side in data transmission of step 404.

As described above, in progressively receiving and displaying the transmitted data in the progressive reception display routine 120, the display scale of a solid shape may be changed in accordance with the size of a transferred shape element (zoom-up routine 121).

The zoom-up routine 121 will be described in detail with reference to FIG. 5.

Since the 3-D shape data to be transmitted has its elements sorted in advance in the area attribute order in the area sort routine 108, the element received last has the area attribute representing the minimum area.

The minimum area of the transferred 3-D shape elements is read or calculated (step 501).

A ratio of the minimum area to the size of a pixel is obtained so as to adjust the minimum size of the transferred shape elements to the size of the display pixel (step 502).

The scale for displaying the entire 3-D shape is adjusted on the basis of the resultant ratio (step 503).

The above embodiment according to the present invention has an assumption that polygon data is transmitted. However, the present invention is not limited to this. Area normal vectors may be transmitted in place of the polygon data.

FIGS. 6A and 6B show the states of data constituted by polygon data and area normal vectors, respectively.

In a polygonal representation, a spherical surface is divided into 2-D figures such as triangles. Each 2-D figure serves as an element (polygon) in the polygonal representation.

To the contrary, in an area normal vector representation, area normal vectors having, as vector quantities, the areas of polygons in the polygon representation, and the position and the normal direction are used as element data.

The present invention is similarly applicable to shape elements having area attributes such as voxel data and particle data.

FIGS. 7A to 7D show the result in which 3-D shape elements (polygons) are progressively transferred in an order from an element having an area attribute representing a larger area.

More specifically, FIG. 7A shows the state upon completion of 30% transfer of all the transmission elements, FIG. 7B shows the state upon completion of 50% transfer of all the transmission elements, FIG. 7C shows the state upon completion of 80% transfer of all the transmission elements, and FIG. 7D shows the state upon completion of 100% transfer of all the transmission elements.

Portions in which images are not displayed indicate portions in which polygon data are not yet transmitted. For example, in FIG. 7A, a hair portion constituted by a coarse data structure and elements having area attributes representing large areas is displayed, but a face portion constituted by smaller polygons is not yet displayed.

Almost all the parts are displayed in FIG. 7C.

As described above, according to this embodiment, a transmitted image can be progressively displayed during transfer. Even in a state wherein all the data are not yet transferred, the state of the entire 3-D figure image is roughly displayed, so that the user can judge whether this displayed image is a desired one.

Figure 5:
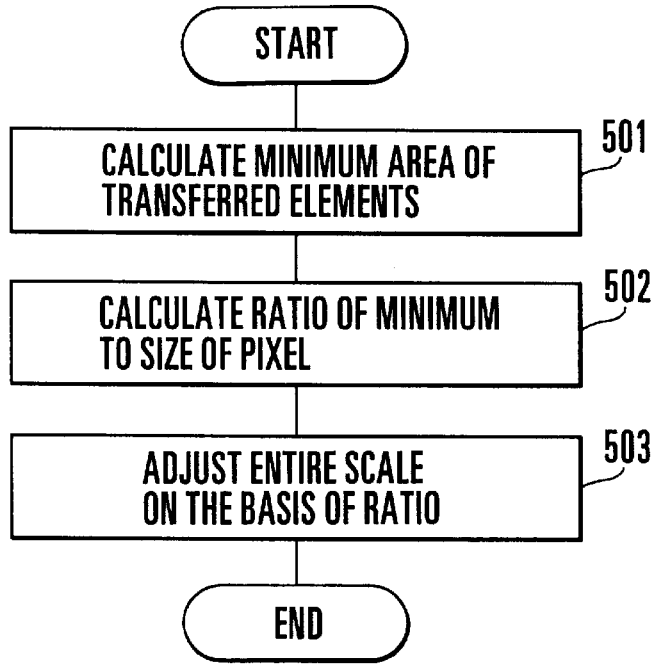
FIG. 5 is a flow chart showing the operations of a zoom-up routine 121 in FIG. 1.

As shown in the flow chart in FIG. 5, the zoom-up routine 121 (FIG. 1) may adjust the screen display scale and display the reduced image.

In this case, when only polygon data having area attributes representing large areas are transmitted, the entire image is reduced in size and displayed.

In the image shown in FIGS. 7A to 7D, the 3-D figure scale increases in an order of FIGS. 7A, 7B, 7C, and 7D.

As has been described above, according to the present invention, 3-D shape data constituted by a plurality of elements representing shapes are progressively transmitted from a transmission unit in units of elements, and a reception display unit progressively displays elements in the reception order. The transmission unit progressively transmit elements in an order from an element having an area attribute representing a larger area.

According to the present invention, during transmission, an intermediate 3-D shape to be displayed is being displayed in, e.g., a coarse state. Upon completion of transmission, the entire 3-D shape is displayed.

The state of the received 3-D shape data can be recognized to some extent before all the data are received. If the user does not want this shape data, he/she can interrupt the reception. Therefore, 3-D shape data can be advantageously transferred and displayed without any waste of network resources at a higher speed.

What is claimed is:

1. A method of transferring and displaying 3-D shape data in a system including a transmission unit for transmitting 3-D shape data constituted by a plurality of elements representing shapes, and a reception display unit for receiving the 3-D shape data and displaying the 3-D shape data as an image, comprising the steps of:

sorting the elements according to area attributes;

requesting the reception display unit to send a display resolution;

receiving the display resolution of the reception display unit;

setting an allowable transmission range to interrupt transmission of elements having higher resolution than the display resolution;

causing said transmission unit to progressively transmit the 3-D data in units of elements; and causing said reception display unit to receive elements transmitted from said transmission unit and progressively displaying the elements in a reception order.

2. A method according to claim 1, wherein the step of causing said transmission unit to progressively transmit the three-dimension data comprises:

progressively transmitting the elements in an order from an element having an area attribute representing a first area to an element having an area attribute representing a second area, wherein said first area is larger than said second area.

3. A method according to claim 1, further comprising the steps of causing said transmission unit to receive display resolution information from said reception display unit, causing said transmission unit to select, from the 3-D shape data, on the basis of the display resolution information, an element having an area attribute representing an area displayable on said reception display unit, and causing said transmission unit to transfer the selected element.

4. A method according to claim 2, further comprising the steps of causing said transmission unit to receive display resolution information from said reception display unit, causing said transmission unit to select, from the 3-D shape data, on the basis of the display resolution information, an element having an area attribute representing an area displayable on said reception display unit, and causing said transmission unit to transfer the selected element.

5. A method according to claim 1, comprising the steps of:

causing said transmission unit to receive display resolution information from said reception display unit;

causing said transmission unit to select, from the 3-D shape data, on the basis of the display resolution information, an element having an area attribute representing an area displayable on said reception display unit; and causing said transmission unit to transfer the selected element.

6. The method according to claim 1, wherein setting an allowable transmission range further includes setting a loss rate to allow the transmission of elements having higher resolution than the display resolution.

\* \* \* \* \*